(12) United States Patent
He et al.

(10) Patent No.: US 7,720,253 B2
(45) Date of Patent: May 18, 2010

(54) VISUAL PERCEPTION MODEL FOR HI-FIDELITY IMAGE WATERMARKING

(75) Inventors: Shan He, Redmond, WA (US); Darko Kirovski, Kirkland, WA (US)

(73) Assignee: Microsoft Corporation, Remond, WA (US)

( * ) Notice: Subject to any disclaimer, the term of this patent is extended or adjusted under 35 U.S.C. 154(b) by 911 days.

(21) Appl. No.: 11/532,040

(22) Filed: Sep. 14, 2006

(65) Prior Publication Data

US 2008/0069396 A1    Mar. 20, 2008

(51) Int. Cl.
*G06K 9/00* (2006.01)
*H04N 1/40* (2006.01)
*H04L 9/32* (2006.01)

(52) U.S. Cl. ................. 382/100; 358/3.28; 713/176
(58) Field of Classification Search ........... 382/100, 382/232; 380/51, 54, 201, 210, 252, 287; 713/176, 179; 348/461, 463; 370/522–529; 283/72, 74–81, 93, 113, 901, 902; 358/3.28
See application file for complete search history.

(56) References Cited

U.S. PATENT DOCUMENTS

| 5,769,793 | A * | 6/1998 | Pincus et al. ............. 600/515 |
| 6,512,837 | B1 * | 1/2003 | Ahmed ................... 382/100 |
| 7,231,061 | B2 * | 6/2007 | Bradley .................. 382/100 |
| 2008/0301767 | A1 * | 12/2008 | Picard et al. ............... 726/2 |

* cited by examiner

*Primary Examiner*—Abolfazl Tabatabai
(74) *Attorney, Agent, or Firm*—Lee & Haynes, PLLC

(57) ABSTRACT

Exemplary systems and methods implement an exemplary visual perception model. This model can be implemented in such applications as imaging, compression, denoising, annotation of hi-fidelity images, etc. In one implementation a perceptual filter estimates an entropy statistic and a standard deviation statistic associated with each pixel of an image, then mixes the entropy statistic and the standard deviation statistic to map an estimation of human perceptual tolerance to noise or alteration in parts of the image. In one application, metadata may be added to an image via a system of synergistic watermarks, in which the watermarks strengthen each other and are placed according to the noise tolerance of the pixels in order to maintain hi-fidelity of the image.

20 Claims, 11 Drawing Sheets

US 7,720,253 B2

VISUAL PERCEPTION MODEL FOR HI-FIDELITY IMAGE WATERMARKING

BACKGROUND

Conventional visual models concerned with image fidelity focus on establishing a function over the visual features of two images to establish how similar they are, or how closely they appeal to the human eye. While simple heuristics such as mean squared error (MSE) and peak signal-to-noise ratio (PSNR) are easy to compute and integrate in optimization scenarios, they have been largely abandoned in favor of quality assessment—of high-quality images.

Some newer, sophisticated models try to focus on combining feature statistics since standard techniques such as MSE and PSNR have not been matched well to perceived visual quality. Some of the main trends in the image quality arts are at an intersection between cognitive sciences understanding the workings of the visual cortex—and adhoc heuristics. For example, one class of algorithms separates images into subbands (channels) that are selective for spatial and temporal frequency and orientation. Sophisticated channel decompositions analyze the neural responses in the primary visual cortex of the brain.

Alternatively, many metrics try to use simpler transforms such as the DCT or separable wavelet transforms to achieve the same goal. Channel decompositions based upon temporal frequencies have also been used for video quality assessment.

One of the most difficult aspects of the problem is to arrive at its definition: what constitutes a hi-fidelity image? Once resolved, analytical progress is likely to follow rapidly. For example, certain distortions may be visible but not considered of poor fidelity suggesting that the correlation between image fidelity and perceived visual quality is arguable or subjective. One approach combines several visual models that are typically mixed using the Minkowski norm, which inherently assumes spatial independence. Thus, visual masking models have been proposed to account for the interdependence of image coefficients.

What is needed is a visual perception model that allows an image to be altered while reliably maintaining the human perception of hi-fidelity in the image. At the same time the visual perception model would lend itself to broad practical application via speedy and simple computations.

SUMMARY

Exemplary systems and methods implement an exemplary visual perception model. This model can be implemented in such applications as imaging, compression, denoising, annotation of hi-fidelity images, etc. In one implementation a perceptual filter estimates an entropy statistic and a standard deviation statistic associated with each pixel of an image, then mixes the entropy statistic and the standard deviation statistic to map an estimation of human perceptual tolerance to noise or alteration in parts of the image. In one application, metadata may be added to an image via a system of synergistic watermarks, in which the watermarks strengthen each other and are placed according to the noise tolerance of the pixels in order to maintain hi-fidelity of the image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

This disclosure describes an exemplary visual perception model. This model can be implemented in such applications as image compression, medical imaging, denoising, annotating hi-fidelity images, i.e., adding metadata to an image, etc. By relying on principles active in the human visual system (HVS) and the broader human perceptual system—exemplary systems and methods described herein aim to quantify tolerance to added data—i.e., "noise"—for each part of an arbitrary image. That is, the system maps an estimation of human perceptual tolerance to alteration in various parts of the image. An exemplary system balances speed and simplicity of computation with accuracy in quantifying perceptual tolerance to noise to find an upper "bound" representing maximum noise tolerance in each local vicinity or "site" of an image.

Each site for which noise tolerance is estimated is typically a pixel and surrounding neighbor pixels within a vicinity of the pixel. The noise tolerance of the numerous sites making up an image can then be mapped and used, for example, to embed data into the image without lessening the perceived fidelity of the image. The noise tolerance map thus created represents the tolerance of each part of the image to the addition of data such that the fidelity of the image is not significantly compromised.

In one implementation, an exemplary system that applies the exemplary visual perception model begins to create the noise tolerance map by mixing outputs of two filters: an entropy filter and a differential localized standard deviation (SD) filter. The mixture may then be low-pass filtered and normalized. This application of the exemplary model produces perceptual hi-fidelity that is substantially better (perceived as more faithful to an original image) than conventional tools of similar complexity. Although there are numerous applications for the exemplary model, from image compression to medical imaging and denoising, an image annotation application is described herein as an example.

In one implementation of an image annotation application, the objective is to embed, for example, 32 bits of metadata into a single image in a manner that is robust to aggressive JPEG compression and image cropping. Exemplary systems described herein have demonstrated the effectiveness of the exemplary model on a database of high-challenge images.

Exemplary System/Environment

Figure 1:
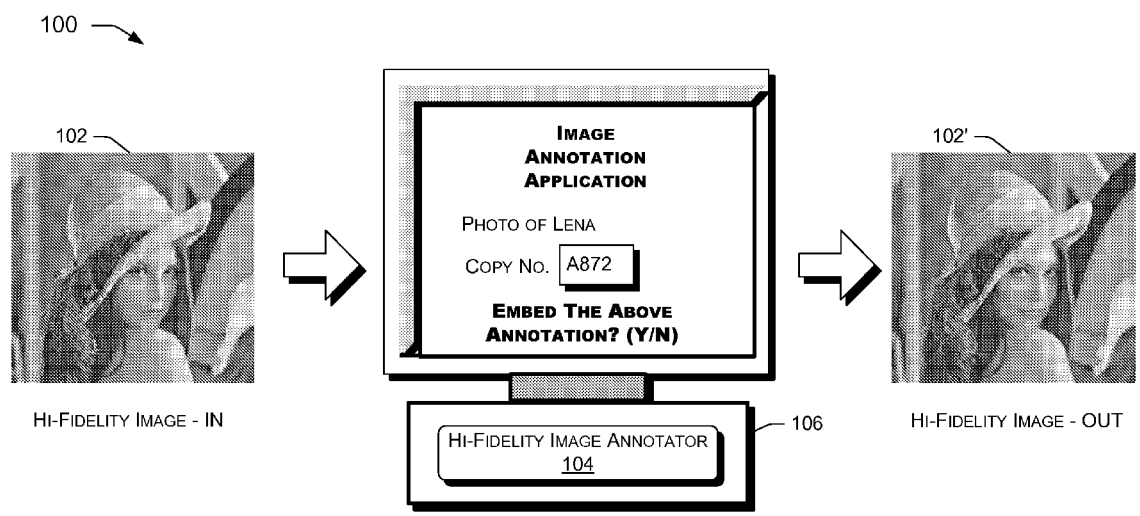
FIG. 1 is a diagram of an exemplary system for using an exemplary visual perception model for hi-fidelity image annotation.

FIG. 1 shows an exemplary system 100 (and environment) for implementing the visual perception model introduced above. The exemplary system 100 scrutinizes each site of an image for noise tolerance. A site may be a single pixel and its surrounding neighbors within the vicinity of the pixel, out to a radius of "r" pixels. Such a "noise-tolerance-discriminatory" system 100 then aims to embed metadata only where the addition will not affect image fidelity, i.e., will not be noticed very much or at all by the human visual system (HVS) or the human perceptual system. Thus, when a hi-fidelity image 102 is input into the system 100, substantially the same hi-fidelity image 102' is output from the system 100. The exemplary visual perception model may be embodied in an engine, such as a hi-fidelity image annotator 104, hosted on a computing device 106.

Figure 2:
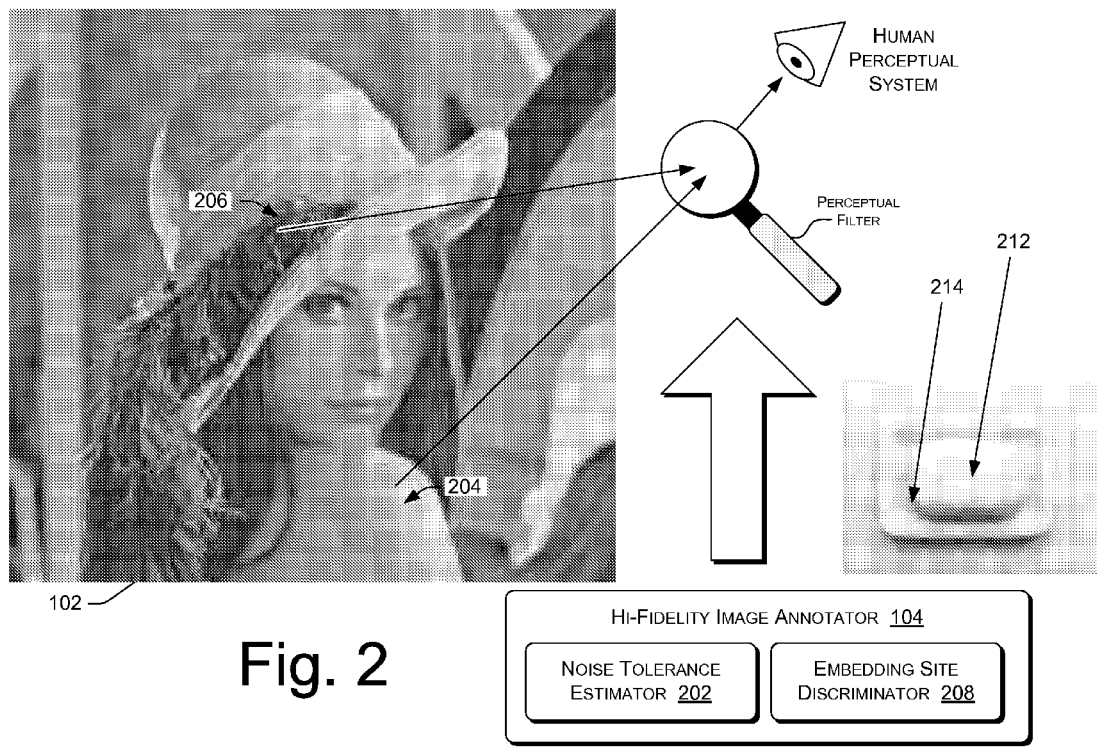
FIG. 2 is a diagram of exemplary perceptual filtering that determines where data will be embedded in an image.

FIG. 2 shows that the hi-fidelity annotator 104 may include a noise tolerance estimator 202 that scans the image 102 site-by-site to map noise tolerance for each site in the image 102. Some parts of the image 102, such as the smooth and even-toned surface of a shoulder 204 cannot tolerate the addition of noise without degrading image fidelity. This is because the HVS, in some circumstances, is so sensitive that it can detect a single photon of light in a completely dark room. Likewise, the HVS can detect a single darkened pixel among the white pixels of a uniformly white image on a computer display. Thus, a monotonous surface or a smooth edge cannot tolerate much noise.

Other vicinities of the same image 102, such as wild hair, fir, clothes, feather boa 206, etc., are more complex and may possess a closely packed multitude of nearly random lines, shapes, and edges; complex mixtures of color and intensity; variegated texture; etc., that are highly tolerant of at least some added noise. From one point of view, such vicinities already contain a high level of visual energy, so that the addition of a little more noise is difficult or impossible for the HVS to detect.

The hi-fidelity image annotator 104 may also include an embedding site discriminator 208 that adds annotation data—the noise—as one or more watermarks, for example, only to those sites that have a high enough noise tolerance. The noise tolerance estimator 202 and the embedding site discriminator 208 allow the hi-fidelity image annotator 104 to add data to many challenging images, such as soap dish image 210, without degrading hi-fidelity of the image 210. Thus, in the soap dish image 210, the hi-fidelity image annotator 104 maps low noise tolerance sites 212 and moderate noise tolerance sites 214. Data is embedded in the moderate noise tolerance sites 214 in preference over the low noise tolerance sites 212.

Exemplary Engines

Figure 3:
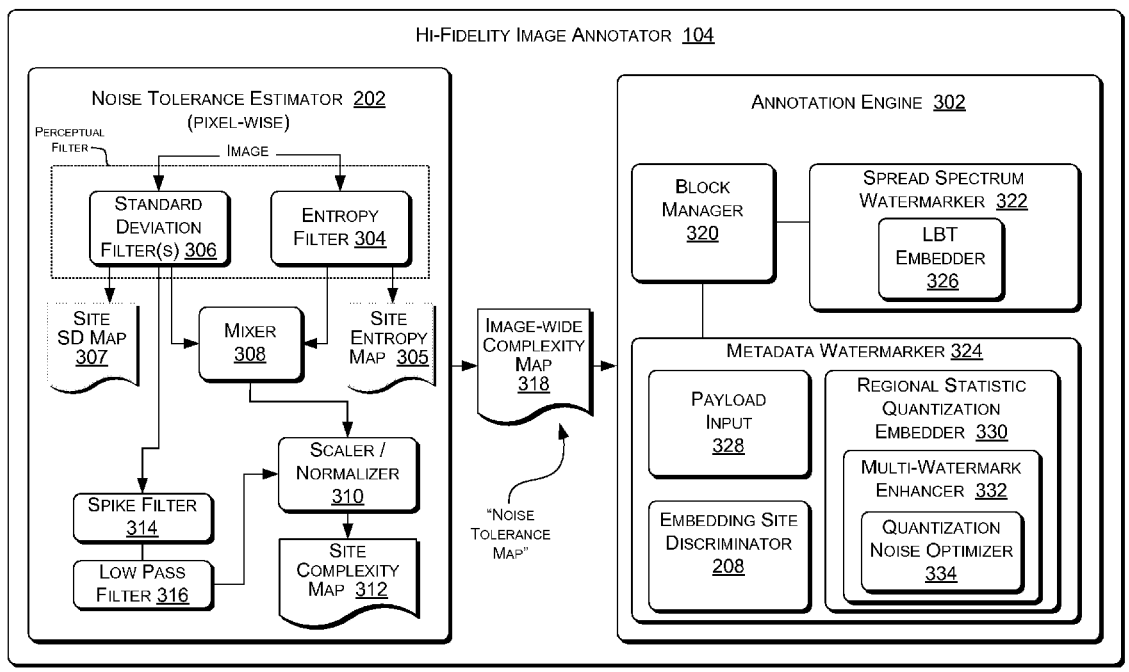
FIG. 3 is a block diagram of the exemplary hi-fidelity image annotator of FIGS. 1 and 2 in greater detail.

FIG. 3 shows the exemplary hi-fidelity image annotator 104 of FIGS. 1 and 2 in greater detail. The illustrated configuration of the exemplary hi-fidelity image annotator 104 is only one implementation, and is meant to provide only one example arrangement for the sake of overview. Many other arrangements of the illustrated components, or similar components, are possible within the scope of the subject matter. Such an exemplary hi-fidelity image annotator 104 can be executed in hardware, software; or combinations of hardware, software, firmware, etc.

In the illustrated implementation, the exemplary hi-fidelity image annotator 104 includes the noise tolerance estimator 202 and the embedding site discriminator 208 introduced above in FIG. 2. The embedding site discriminator 208 is thus shown as a component of an annotation engine 302.

The noise tolerance estimator 202 may estimate noise tolerance one pixel at a time, where each pixel represents a site including the pixel itself and its surrounding neighbor pixels out to radius r. The noise tolerance estimator 202 includes an entropy filter 304 to produce a site entropy statistic or a site entropy map 305 for each pixel and its neighboring pixels; and a standard deviation filter 306 (or filters) to produce a site standard deviation statistic or site standard deviation map 307 for each pixel and its neighboring pixels. The noise tolerance estimator 202 may also include a mixer 308, a scaler/normalizer 310, and a site complexity map 312. A spike filter 314 and a low-pass filter 316 may be present to provide a baseline for the scaler/normalizer 310.

The noise tolerance estimator 202 produces an image-wide complexity map 318, which for many applications is equivalent to a noise tolerance map, such as discussed above. A given application module, such as the annotation engine 302, uses the image-wide complexity map 318 to perform its function. Thus, if the annotation engine 302 is replaced by a different application module, such as a denoising engine (not shown) the denoising engine would use the same noise tolerance estimator 202 and the image-wide complexity map 318, thereby converting the hi-fidelity image annotator 104 into a hi-fidelity denoiser.

In the illustrated example, the annotation engine 302 further includes a block manager 320, a spread spectrum (SS) watermarker 322 (for embedding a "soft" watermark), and a metadata watermarker 324 (which embeds a "hard" watermark). The SS watermarker 322 further includes a lapped biorthogonal transform (LBT) embedder 326. The metadata watermarker 324 further includes a payload input 328, the above-introduced embedding site discriminator 208, and a regional statistic quantization embedder 330, which may further include a multi-watermark enhancer 332 and a quantization noise optimizer 334. The function and operation of the exemplary hi-fidelity image annotator 104 will be discussed in greater detail, further below, after introducing a watermark detector and data extractor, which will be described next.

Figure 4:
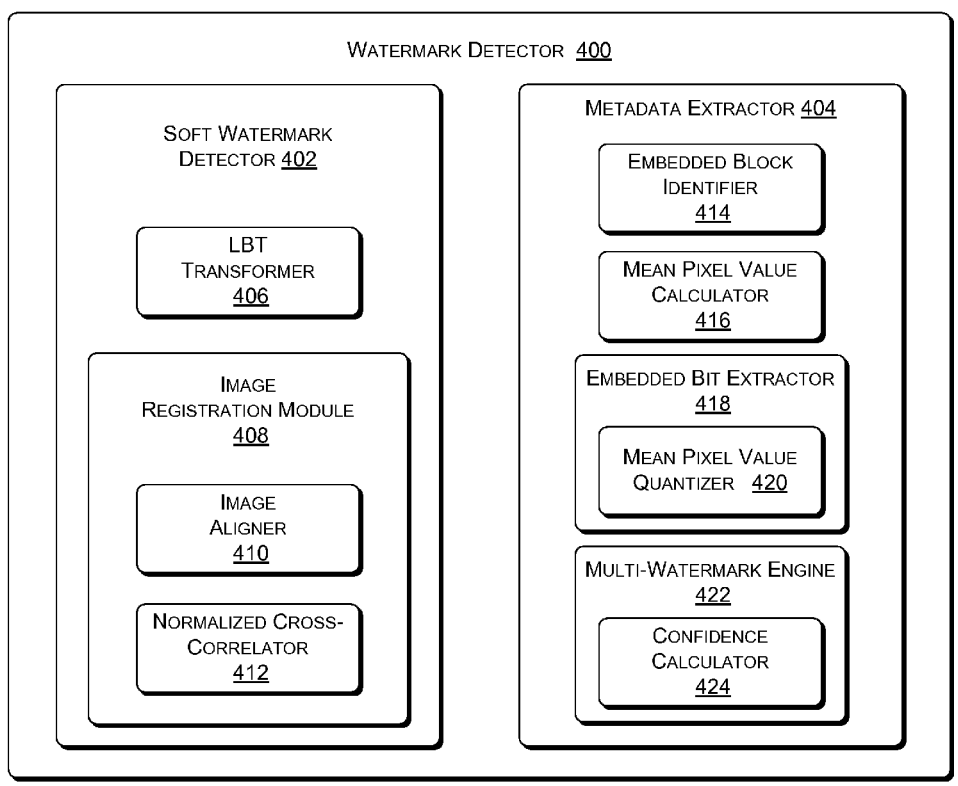
FIG. 4 is a block diagram of an exemplary watermark detector.

FIG. 4 shows an exemplary watermark detector (& data extractor) 400, including a soft watermark detector 402 and a metadata extractor 404. The illustrated configuration of the watermark detector 400 is only one implementation that is meant to provide one example arrangement for the sake of overview. Other arrangements of the illustrated components, or similar components, are possible within the scope of the subject matter. Such an exemplary watermark detector/data extractor 400 may be executed in hardware, software; or combinations of hardware, software, firmware, etc.

The soft watermark detector may further include an LBT transformer 406, and an image registration module 408, which further includes an image aligner 410 and a normalized cross-correlator 412.

The metadata extractor 404 may further include an embedded block identifier 414, a mean pixel value calculator 416, an embedded data bit extractor 418 that has a mean pixel value quantizer 420; and a multi-watermark engine 422 that has a confidence calculator 424.

Operation of the two engines—the exemplary hi-fidelity image annotator 104 and the exemplary watermark detector/data extractor 400—will be now be described.

Operation of the Exemplary Engines

The visual perception model tries to provide a solution to the following problem. Given an image $I \in \{Z^*\}^{m \times n}$ find a function $f()$ such that $I \in \{Z^*\}^{m \times n} \to I \in \{Z^*\}^{m \times n}$ whose result $f(I)$ quantifies the magnitude of random noise $I_n$ that one can add to image I so that the resulting image $I+I_n$ is perceived as a high quality copy of I. This objective is different from previous conventional models in that it aims at quantifying a "bound" on the amount of perceptually "invisible" noise that can be added as opposed to quantifying how perceptually similar two images are.

The exemplary hi-fidelity image annotator 104 applies the model in the pixel domain for two reasons. First, the model can be applied at no transformation cost in applications that require image transforms such as wavelets, lapped transforms, or DCT. Second, perceptual quality for block transforms such as JPEG's 8×8 DCT is difficult to model, as the assessment procedure has to have an understanding of the block interleaving in use (if any) as well as access to data in the neighboring blocks. In such a setup, it is difficult to predict artifacts such as blocking, aliasing, ringing along edges, etc.

Accordingly, the exemplary hi-fidelity image annotator 104 combines the outputs of two simple filters: the entropy filter 304 and the (differential) standard deviation filter 306 to estimate visual sensitivity to noise The mixer 308 can use a non-linear function and a smoothing low-pass filter in a post-processing step. As a result, the noise tolerance estimator 202 distinguishes image sites with sharp edges of arbitrary shape as well as uniformly or smoothly colored areas as "highly sensitive to noise," whereas the noise tolerance estimator 202 identifies areas with noisy texture as "tolerant to noise." As mentioned, this ability to distinguish tolerance to visual noise can be particularly appealing to several applications such as image compression, denoising, and watermarking.

In one implementation, the hi-fidelity image annotator 104 does not impose any security requirements for the exemplary watermarking.

The illustrated annotation engine 302 embeds two watermarks. The first "soft" watermark is a strong direct-sequence spread-spectrum (SS) watermark tiled over the image in the lapped biorthogonal transform (LBT) domain. This watermark only signals the existence of the metadata and can also be used for image alignment. The second watermark represents or contains the metadata. In one implementation, the metadata watermarker 324 embeds the metadata bits using a regional statistic quantization method. The quantization noise optimizer 334 improves the strength of the soft SS watermark while obeying the constraints imposed by the perceptual model (that perceptual fidelity not be unduly compromised by addition of watermarks).

The SS and metadata watermarks embedded by the annotation engine 302 are particularly robust to aggressive JPEG compression and cropping. In other implementations, the metadata watermark can be made robust to other signal processing procedures such as histogram equalization, scaling, and certain affine transforms.

The hi-fidelity image annotator 104 applies the exemplary visual perceptual model in the pixel luminance domain. The noise tolerance estimator 202 relies on several localized statistics to quantify the noise tolerance of each pixel and its surrounding pixel neighbors.

Given an image $I \in \{Z^*\}^{m \times n}$, for each of its pixels $k(x,y) \in I$ where x and y denote pixel coordinates, the noise tolerance estimator 202 examines each pixel's r-by-r neighborhood constituting a site (e.g., neighborhood dimensionality r is an odd integer greater than 1) where $\Pi(k)$ represents the site centered at k. The following metrics are defined for operation of the noise tolerance estimator 202, in Equations (1), (2), and (3):

$$S(k, r) = \sqrt{\frac{1}{r^2 - 1} \sum_{i \in \Pi(k)} \left( i - \frac{1}{r^2} \sum_{j \in \Pi(k)} j \right)}, \quad (1)$$

$$E(k, r) = -\sum_{i=1}^{256} p(k, i) \log[p(k, i)], \quad (2)$$

$$p(k, i) = Pr[k = i | k \in \Pi(k)]. \quad (3)$$

Figure 5:
FIG. 5 is a diagram of a hi-fidelity embedding results from an exemplary system.
Figure 5:
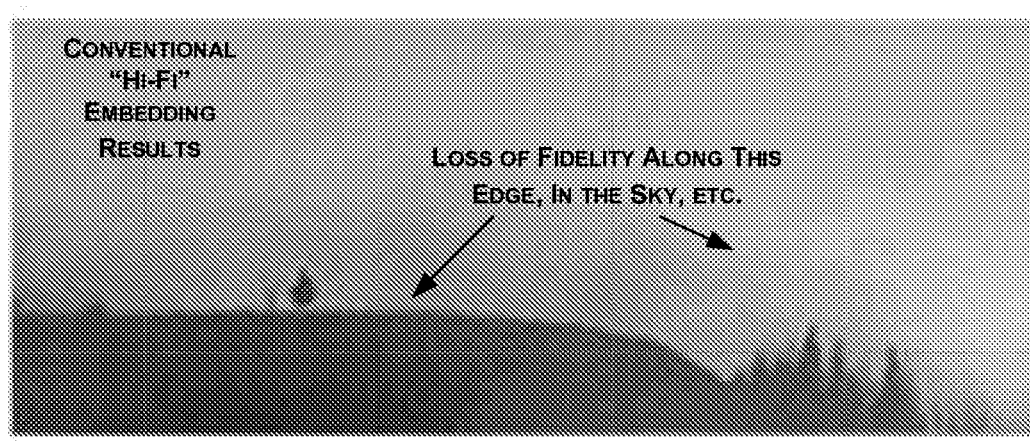
Figure 5:
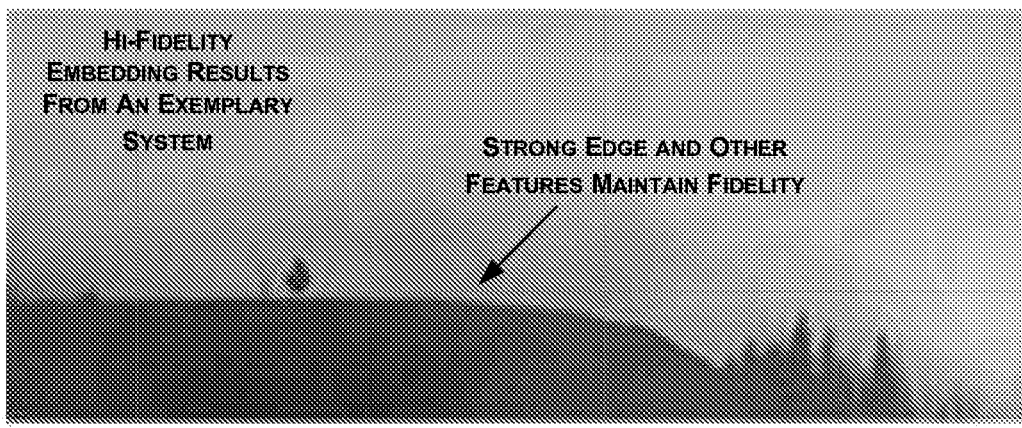

Equation (2) defines the entropy map E(k, r) 305, which indicates the complexity of the surrounding neighborhood for a given pixel. In one sense, this is a simple heuristic to identify pixels that are perceptually less tolerant to noise. Empirically, this heuristic to identify pixels that are perceptually less tolerant to noise holds true for pixels with low E(k, r), i.e., regions with smoothly changing luminosity. But a high value of E(k, r) does not necessarily imply strong tolerance to noise. Examples that do not conform to this rule are irregular edges similar to the one illustrated in FIG. 5. An example of an image-wide entropy map 602 of the "Lena" image 102 is presented in FIG. 6. The image-wide entropy map 602 was created using r=9.

Figure 6:
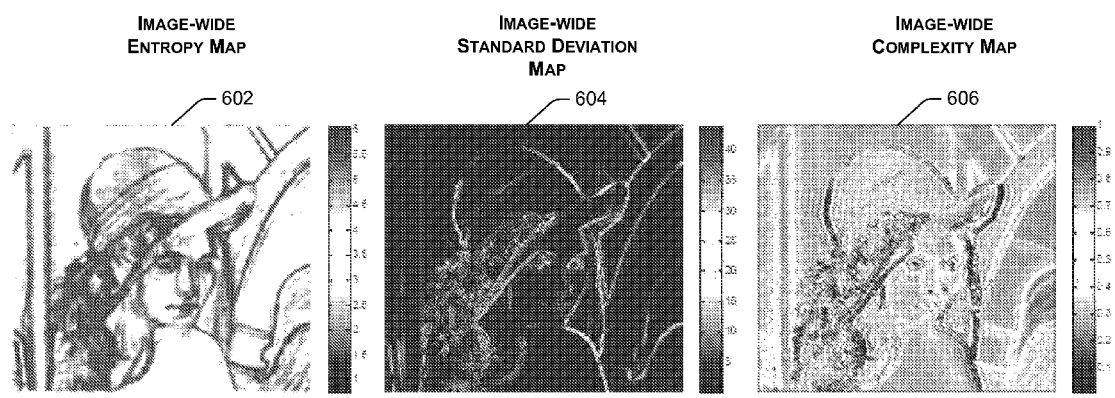
FIG. 6 is a diagram of exemplary entropy, standard deviation, and complexity maps.

The differential standard deviation filter 306 $D(k)=|S(k,r_1)-S(k,r_2)|, r_1>r_2$, can also be used to expose the effect of edges on visual fidelity. If both $S(k,r_1)$ and $S(k,r_2)$ are low, then the noise tolerance estimator 202 concludes that the $r_1$-neighborhood centered around k is not tolerant to noise, similar to the result via the entropy filter 304. On the other hand, if both $S(k,r_1)$ and $S(k,r_2)$ have high values, the noise tolerance estimator 202 may conclude that the visual content around k is noisy and that it is more noise-tolerant. In most cases, disproportionate $S(k,r_1)$ and $S(k,r_2)$ signals an edge in the neighborhood of k and low tolerance to noise. Thus, the noise tolerance estimator 202 employs the standard deviation filter 306 as a fast, solid performer—its image-wide output, a differential standard deviation map 604 for the "Lena" image 102 is depicted in FIG. 6. The illustrated image-wide differential standard deviation map 604 was generated using $r_1=5$ and $r_2=3$ pixels.

In order to mix the entropy E( ) and standard deviation D( ) features, the noise tolerance estimator 202 normalizes both feature matrices and then combines them as follows in Equation (4):

$$m(D, E) = \exp\left[-\frac{(D-1)^2 + (E-1)^2}{2s^2}\right]. \quad (4)$$

Figure 7:
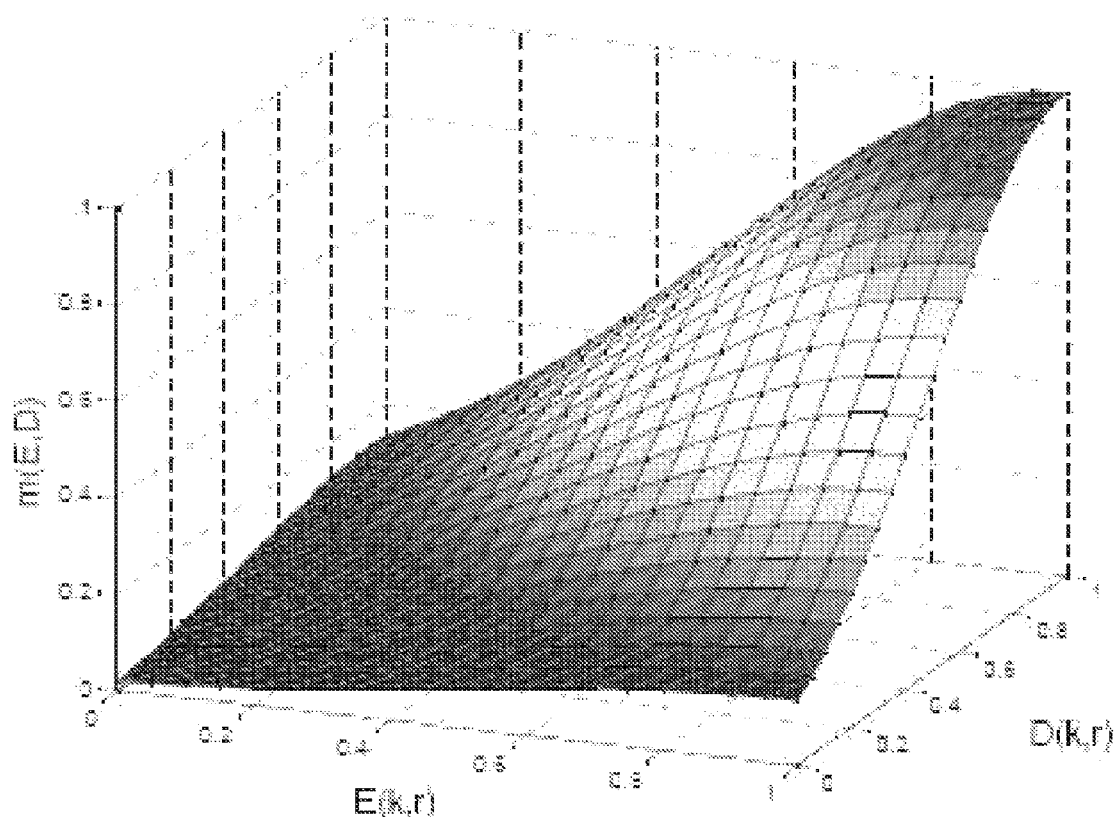
FIG. 7 is a representation of an exemplary mixing function.

As shown in FIG. 7, the mixing function m( ) used by the mixer 308 is non-linear and has the shape of a 2D Gaussian distribution, where parameter s adjusts the shape of the function. The mixing function resembles a smooth AND operator between entropy and standard deviation. Low values of s raise the complexity value for the pixel with both high entropy and standard deviation while suppressing other pixels. Large s allows pixels with moderate entropy and standard deviation to have moderately high complexity value.

The process is finalized by filtering D(k) with a 3×3 spike filter 314: $F_1 = \{-\frac{1}{8}, -\frac{1}{8}, -\frac{1}{8}; -\frac{1}{8}, 1, -\frac{1}{8}; -\frac{1}{8}, -\frac{1}{8}, -\frac{1}{8}\}$ followed by a low-pass filter 316 to obtain m(D, E). This processing aims to expose only strong edge effects. Finally, by scaling m(D, E)/m'(D, E) and then normalizing the result, the scaler/normalizer 310 creates the site complexity map f(i) 312. An image-wide final complexity map 318 is shown in FIG. 6 for the "Lena" image 102. Note that the illustrated example of this map 318 has minor low-frequency artifacts from using a fast low-pass filter. In numerous experiments, however, these artifacts did not appear on the final hi-fidelity images 102'.

In the illustrated hi-fidelity image annotator 104, the abilities of the exemplary visual perception model are implemented in a "blind" detection scenario for embedding metadata in relatively large images. Thus, the original image 102 does not need to be available to the watermark detector/data extractor 400 for detection to proceed. In one implementation, as mentioned, the objective is to embed 32 bits of metadata into an image 102 so that their detection is as robust as possible to JPEG compression and cropping. There is no imposed requirement on security of the metadata. Alternative image watermarking schemata that aspire to this goal can use the exemplary visual perception model to achieve visual transparency as well.

The soft, spread-spectrum watermark signals metadata presence. If the watermark detector 400 detects this SS watermark, the decoder proceeds with the message extraction by analyzing localized statistics of the image.

The soft SS watermark serves two purposes, to detect the existence of the metadata, and to enable the image registration module 408 to align and register the image 102' at the detector side due to potential cropping or other type of misalignment.

In one implementation, the SS watermark is a random i.i.d. sequence taking value from $\{-1, 1\}$ or drawn from a standard normal distribution $N(0, 1)$. The spread spectrum watermarker 322 spreads the SS watermark over a continuous image region (block) of size $L_r \times L_c$. This is the basic SS watermark block size used by the block manager 320. The spread spectrum watermarker 322 creates a full-image watermark by tiling the same basic SS watermark block. Consequently, the smallest image that can be augmented with metadata is the size of the basic SS watermark block. In order to reduce blocking effects, a lapped biorthogonal transform (LBT) embedder 326 embeds the SS watermark in the LBT domain. In one implementation, in the LBT domain, the LBT embedder 326 leaves the DC and high frequency components untouched for better visual quality and robustness to lossy compression, respectively. An exemplary mask is used for each 4-by-4 block of the LBT image, as in Equation (5):

$$t = \begin{bmatrix} 0 & 1 & 1 & 0 \\ 1 & 1 & 1 & 0 \\ 1 & 1 & 0 & 0 \\ 0 & 0 & 0 & 0 \end{bmatrix}, \quad (5)$$

where 1's indicate the LBT coefficients used for SS watermark embedding. Next, the SS watermarker 322 uses f(I) to adjust the energy of the SS watermark according to the content of the image 102. Since the complexity map 318 is in the pixel domain, the SS watermarker 322 can take the inverse LBT transformation of the watermarked image and re-weight the watermark in the pixel domain using f(I). Given the above considerations, the SS watermark embedding can be expressed as in Equation (6):

$$Y = I + \alpha \cdot f(I)\{LBT^{-1}[LBT(I) + wt] - I\} \quad (6)$$

where wt denotes the masked SS watermark, and Y represents the watermarked image 102'. The parameter $\alpha$ adjusts the watermark energy to achieve the desired trade-off between visual quality and robustness. In one implementation, $\alpha=10$ in order to create images within 55-50 dB PSNR from the original image 102'. The SS watermark alone is hardly visible at these noise levels. However, it conveys only 1.5 bits of information to the detector 400.

Once the SS watermark is embedded, the metadata watermarker 324 implements the second watermark layer, the metadata watermark, which represents the metadata bits. Since the detector 400 has no access to the original image 102, the host signal acts as a strong source of noise during detection. To reduce the interference from the host signal, the metadata watermarker 324 deploys quantization of source's first order statistics to embed the metadata watermark. Specifically, the block manager 320 partitions each part of the image 102 such that each basic SS watermark block is augmented into smaller building blocks for embedding bits of the metadata watermark. If the size of the large SS watermark blocks is $L_r \times L_c$, then the number of pixels included in each small building block for the metadata watermark bits equals $$\kappa = \frac{L_r \times L_c}{32K},$$

where the K in the denominator is denoted as the scaling constant. Typically, K is selected such that the size of a small building block for embedding a bit of the metadata watermark is between 4×4 and 8×8 pixels. For example, for a large SS watermark block of size 640×480 pixels, the number of pixels for a smaller building block might be $\kappa=48$, i.e., the smaller building block would have dimensions of 8×6 pixels, given a scaling constant K=200. That is, in this example, each large SS watermark block includes 64 small building blocks for the metadata watermark bits: the large SS watermark block is partitioned into an 8×8 grid of small building blocks. Then, for each metadata bit, the block manager 320 randomly picks building blocks within the pixel field of the SS watermark block and assigns them to the current metadata bit for purposes of embedding the bit. In one implementation, the number of building blocks randomly picked is equal to the number of building blocks per SS watermark block (64 in this example) divided by 32 building blocks (resulting in 2 building blocks to be randomly picked, in this example). Each small building block that is randomly picked is assigned only to one metadata bit. The set of all coefficients that belong to these building blocks can be defined as $\Lambda_i$, $i=1 \ldots 32$. The metadata watermarker 324 computes the first order statistics of the coefficients in each $\Lambda_i$, as in Equation (7):

$$\mu_i = \frac{1}{\kappa K} \sum_{p \in \Lambda_i} y(p). \quad (7)$$

To embed a bit $b_i$, the regional statistic quantization embedder 330 quantizes $\mu_i$ to an even number of Qs if $b_i$ has value "0," or to an odd number of Qs if its value is "1." Q is the quantization step size. That is, as shown in Equations (8) and (9):

$$\mu'_i = \left\lceil \frac{(\mu_i + Q)b_i}{2Q} \right\rceil 2Q - Qb_i, \quad (8)$$

$$\Delta \mu_i = \mu'_i - \mu_i, \quad (9)$$

Where $\mu_i'$ is the mean value after metadata watermark embedding and $\Delta\mu_i$ is the corresponding $\Lambda$i-wide change. Straightforwardly, a larger Q results in a more robust HW at the cost of decreased visual quality.

Figure 8:
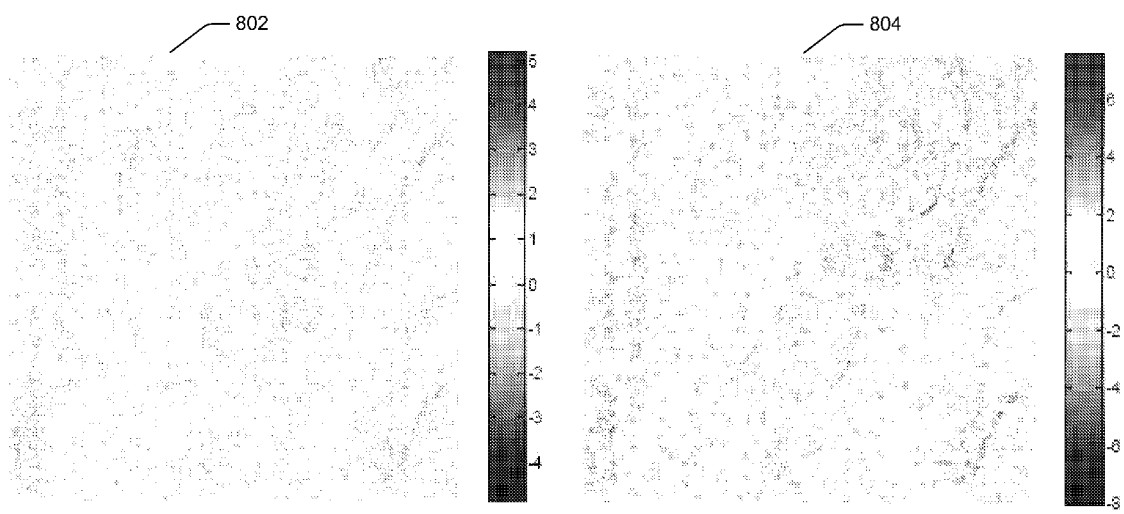
FIG. 8 is a diagram of exemplary pixel changes for a soft watermark and both the soft watermark and a hard watermark.

The next step is to adjust the pixel values in $\Lambda$i so that the changes of its mean value equal $\Delta\mu_i$. To get better visual quality, the embedder 330 deploys f(I) to allocate and quantify the metadata watermarker for each pixel. In one implementation, the change of each pixel value, y(p), $p \in \Lambda_i$, is designed to be proportional to its complexity value f(p), as in Equation (10):

$$\Delta y(p) = \Delta \mu_i K \kappa \frac{f(p)}{\sum_{P \in \Lambda_i} f(p)} \quad (10)$$

where $\Delta\mu_i K\kappa$ corresponds to the total changes of the pixel values inside $\Lambda$i. For certain images, the building blocks in $\Lambda$i may consist of only smooth regions. Then, large $\Delta\mu_i$ will result in a large change for most of the pixels in $\Lambda$i and likely incur visual distortion. To provide high-fidelity, the metadata watermarker 324 first examines the summation of the complexity values in $\Lambda$i and compares it with a threshold $h_c$ to decide whether $\Lambda$i is suitable for embedding or not. If the complexity of $\Lambda$i is high enough, the regional statistic quantization embedder 330 applies the above-described embedding, otherwise the metadata watermarker 324 discards the block and discards the bit. The parameter $h_c$ can be selected to trade off between the robustness of the HW and the visual quality. Since the building blocks in $\Lambda$i are chosen randomly, the probability for the complexity of $\Lambda$i below threshold $h_c$ is usually very low. As a practical matter, in real-world tests of the exemplary hi-fidelity image annotator 104, all image blocks encountered were complex enough for embedding. FIG. 8 shows actual pixel value alterations after embedding the SS watermark (left) 802, and metadata watermark (right) 804.

The above operation of the metadata watermarker 324 does not take into account the SS watermark that has already been embedded in the image. Since the allocation of watermark energy to individual pixels has a lot of freedom, the multi-watermark enhancer 332 can reallocate the watermark in a manner that favors the SS watermark detection while maintaining the accuracy of the metadata watermark detection. The multi-watermark enhancer 332 allocates the metadata watermark to pixels so that the correlation of the watermarked image with the SS watermarker becomes higher. This is achieved by selecting only the pixels whose corresponding SS watermark component has the same sign as the $\Delta\mu_i$ for embedding, as in Equation (11):

$$\Delta y(p) = \begin{cases} \Delta \mu_i K \kappa \dfrac{f(p)}{\sum p \in \Lambda_i^{'f}} & p \in \Lambda'_i \\ 0 & \text{otherwise} \end{cases} \quad (11)$$

$$\Lambda'_i = \{p | \text{sign}(SW(p)) = \text{sign}(\Delta\mu_i), p \in \Lambda_i\}.$$

In runtime operation of the hi-fidelity image annotator 104 on a database of over 41 large images, after embedding both the soft and hard watermark, PSNR was in the range between 49-40 dB.

Exemplary Detector

In one implementation, the watermark detector 400 has two main components, a SS watermark detector 402 and a metadata extractor 404. If the SS watermark detector 402 finds the presence of a soft watermark, then the watermark detector 400 signals the metadata extractor 404 to extract the embedded metadata.

The LBT transformer 406 first transforms a received test image "z" 102' into the LBT domain to get z'. Because the received image z 102 may have been cropped, the image registration module 408 first aligns the test image 102' by detecting the soft watermark(s). The image aligner 410 achieves this by sliding the basic soft watermark block w over the image z' 102 so that the normalized cross-correlator 412 can examine the normalized cross-correlation (NCC) values as in Equation (12):

$$c(z_i, w) = \frac{(w - \overline{w})(z_i - \overline{z}_i)}{\|w - \overline{w}\| \cdot \|z - \overline{z}\|}, \quad (12)$$

for each sub-block $z_i \in z'$. An operator $\overline{a}$ denotes the mean of the argument a. Fast NCC for image registration can be computed via the Fast Fourier Transform (FFT). The soft watermark detector 402 designates image z 102' as tainted with the soft watermark block w if $\max[c(z_i,W)] > T$, where T is the detection threshold that identifies the probability of a false positive or negative according to the Gaussian error function. In one implementation, the soft watermark detector 402 computes the standard deviation $\sigma$ over $(\forall z_i \in z')c(z_i,w)$ and determines T such that the probability of a false negative is $$\varepsilon_{FN} = \frac{L_r L_c}{2} \text{erfc}\left(\frac{T\sqrt{w}}{2\sigma}\right) \leq 10^{-8},$$

where W denotes the cardinality of the soft watermark. Once the soft watermark is detected, the detector 400 can identify its location in the image and thereby the location of the metadata.

For the hard metadata watermark, the metadata extractor 404 employs a relatively simple technique to extract the metadata. First, the embedded block identifier 414 identifies the building blocks corresponding to each bit. Then, the mean pixel value calculator 416 computes $\mu_i'$ over each set of building blocks. The embedded bit extractor 418 has a mean pixel value quantizer 420 that recovers a bit by quantizing $\mu_i'$ using Q, and examining whether the quantized value is odd or even, as in Equation (13):

$$\tilde{b}_i = \text{mod }\{[\mu_i'/Q/2]\}, \quad (13)$$

where $\tilde{b}_i$ is the extracted bit. In cases where the SS watermark detector 402 finds the existence of more than one SS watermark, the multi-watermark engine 422 uses a soft decoding technique. For simplicity, during embedding, the metadata watermarker 324 uses a repetition code to encode each metadata bit, i.e., the embedder 330 augments each bit into each basic soft watermark block separately. Thus, $\tilde{b}(r,i)$ is denoted as the i-th extracted copy of the bit $b_i$ from the r-th basic SS watermark block. For each bit, the confidence calculator 424 records the distance d(r, i) of the statistic $\mu_i'$ to the nearest reconstruction point. This value quantifies the confidence level of the detection for each raw bit. The multi-watermark engine 422 collects this soft information for all extracted bits and estimates the final metadata bit $B_i$ based on the confidence scores $s_0$ and $s_1$, as in Equation (14):

$$B_i = \begin{cases} 0 & s_0 \geq s_1 \\ 1 & \text{otherwise} \end{cases}, \quad (14)$$

$$s_x = \sum_{\{\forall r | \hat{b}(r,i)=x\}} \exp\left[\frac{-10|d(r,i)|}{Q}\right].$$

Robustness of Embedded Watermarks

Figure 9:
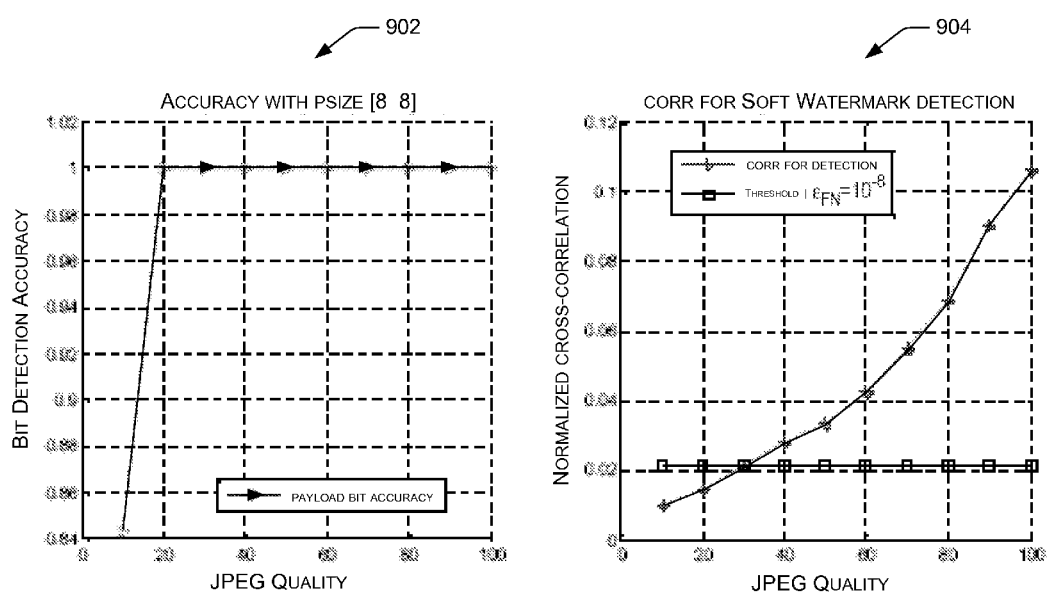
FIG. 9 is a diagram of exemplary detection accuracy of exemplary spread spectrum and metadata watermarks.

In one implementation, both the soft and the hard watermark survive a JPEG compression with the quality parameter set to 30 and with $\epsilon_{FN}=10^{-8}$ confidence. FIG. 9 shows detection performance on the Lena image 102' under JPEG compression that ranged from 100 down to 10 for the quality parameter. Detection accuracy for both the metadata watermark (left) and SS watermark (right) is illustrated. For the Lena image 102', the SS watermark produced a PSNR of 53.38 dB and the metadata watermark resulted in the final PSNR of 46.58 dB.

Exemplary Methods

Figure 10:
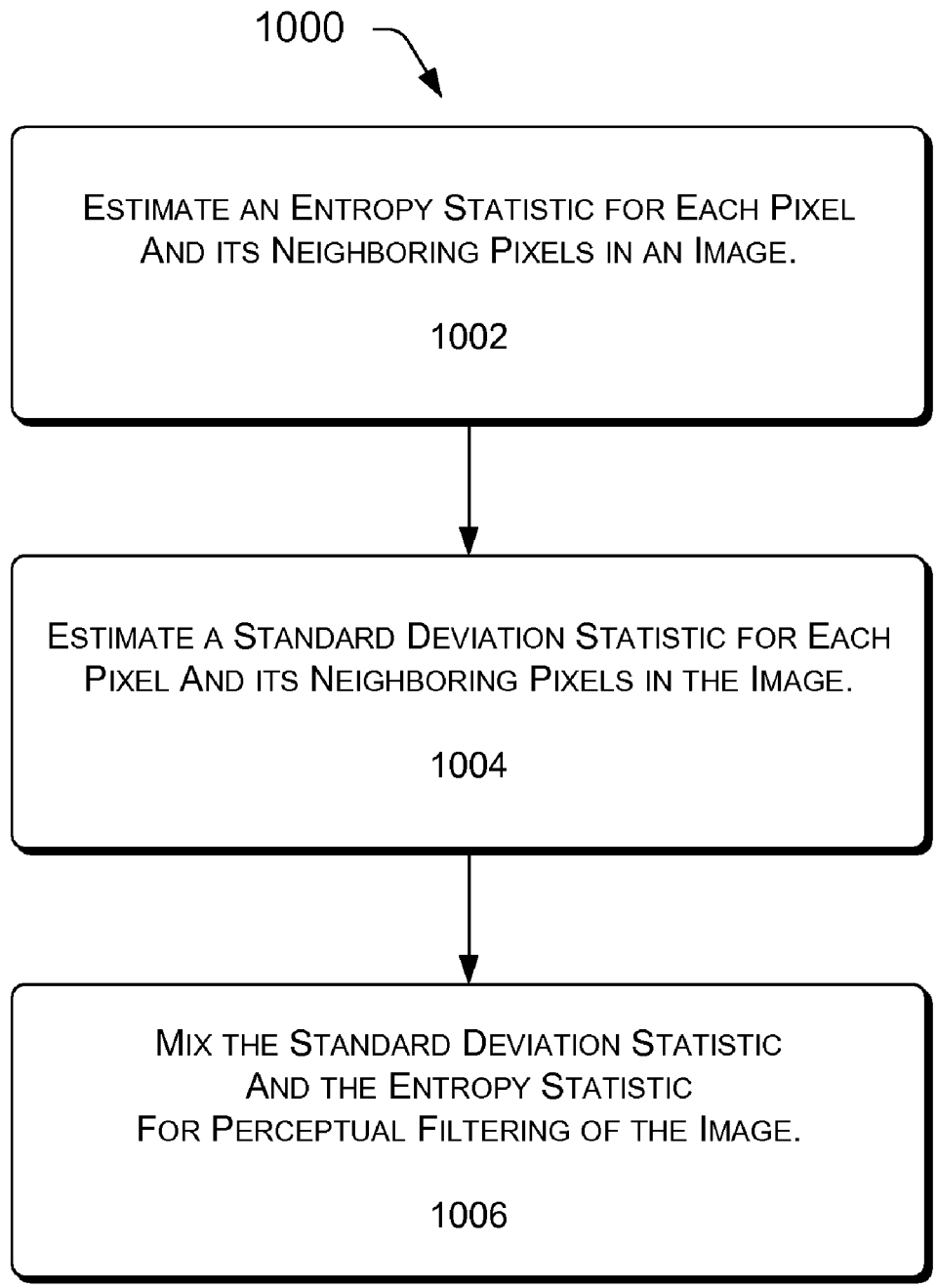
FIG. 10 is a flow diagram of an exemplary method for perceptually filtering the pixels of an image for quantifying noise tolerance.

FIG. 10 shows an exemplary method 1000 of mapping an estimation of perceptual tolerance to noise for the various parts of an image. In the flow diagram, the operations are summarized in individual blocks. Depending on implementation, the exemplary method 1000 may be performed by hardware, software, or combinations of hardware, software, firmware, etc., for example, by components of the exemplary noise tolerance estimator 202.

At block 1002, an entropy statistic is estimated for a pixel and its neighboring pixels within a selected vicinity. The image is scanned one pixel at a time, estimating entropy for each group centered on a current pixel.

At block 1004, likewise, a differential standard deviation statistic is also estimated for the same pixel-groups, e.g., at the same time as the entropy statistic is being estimated.

At block 1006, the standard deviation statistic and the entropy statistic are mixed to effect perceptual filtering. The perceptual filtering maps the image as an estimation of human perceptual tolerance to alteration of the image at its different parts. The alteration usually means visual noise, that is, a change in a pixel attribute such as luminance that creates artifacts in the image or otherwise degrades the image fidelity.

Figure 11:
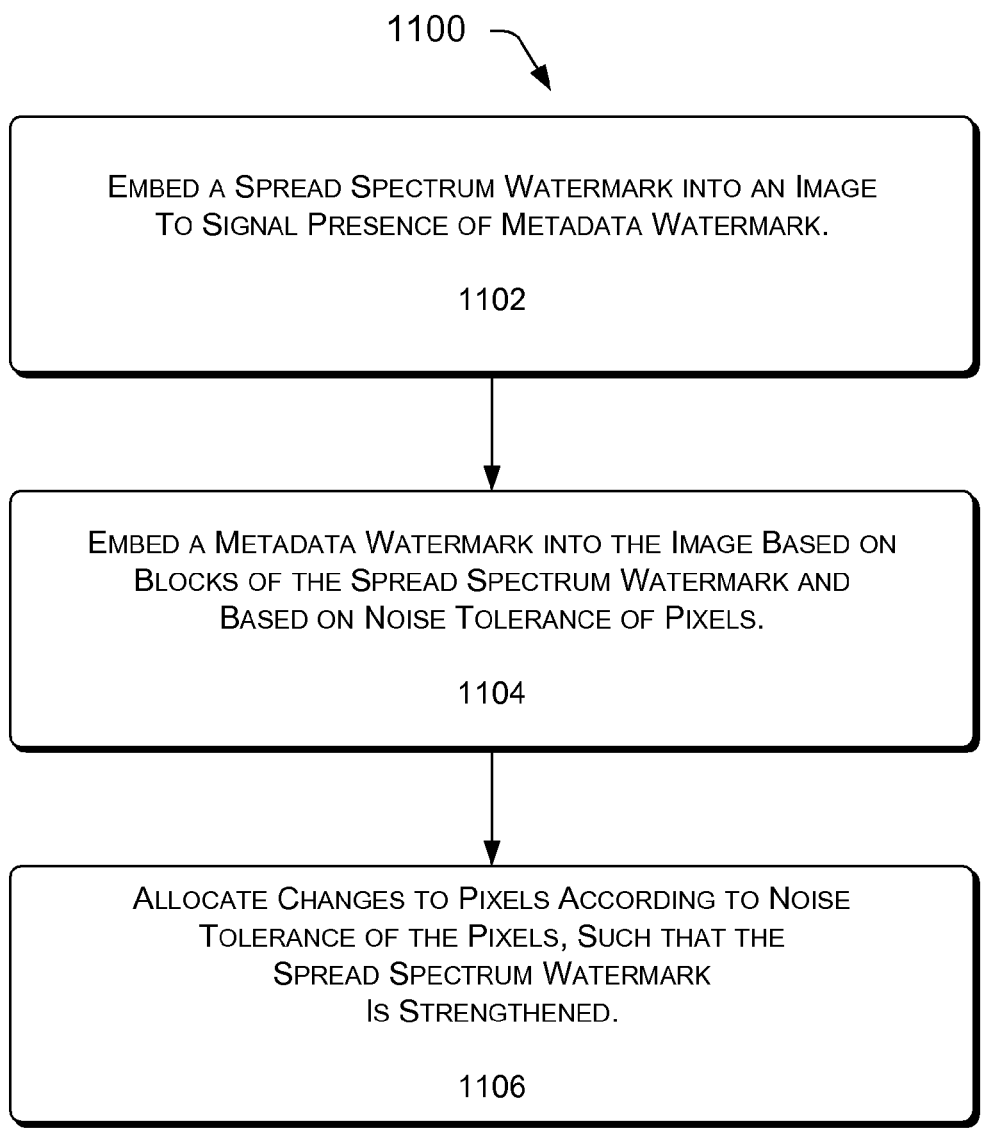
FIG. 11 is a flow diagram of an exemplary method of embedding into an image using watermarks that strengthen each other and that hi-fidelity of the image.

FIG. 11 shows an exemplary method 1100 of embedding metadata into an image without degrading the image's fidelity. In the flow diagram, the operations are summarized in individual blocks. Depending on implementation, the exemplary method 1100 may be performed by hardware, software, or combinations of hardware, software, firmware, etc., for example, by components of the exemplary hi-fidelity image annotator 104.

At block 1102, a spread spectrum watermark is augmented into the image to signal the presence of added metadata in the image. That is, the spread spectrum watermark points to the existence of a metadata watermark. In one implementation, the spread spectrum watermark is embedding in a block of the image and the block is re-tiled over the larger image using lapped biorthogonal transform (LBT) embedding. Since the spread spectrum watermark can be discerned anywhere in the image, it is also useful for registering or aligning the image at a blind detector that does not have access to the original image. This ability to align the image remains, even when the image has been cropped.

At block 1104, metadata is embedded into the image as an additional watermark that is based on partitioned blocks of the spread spectrum watermark and placed into the image based on noise tolerance of the pixels. In one implementation, a block of the spread spectrum watermark is partitioned into smaller blocks. Each bit of the metadata is embedded by quantizing first order statistics of the coefficients of the smaller blocks, wherein the quantizing uses an even number of a quantization step size if the bit is a 0 bit and uses an odd number of the quantization step size if the bit is a 1 bit.

At block 1106, for embedding the metadata watermark, changes to the attribute of the pixels in each smaller block are allocated such that the change is proportional to the noise tolerance of the pixel, and such that the other, spread spectrum SS watermark is strengthened in its robustness to image compression and cropping. In other words, a quantization optimization allocates the final changes to pixel attributes so that the metadata watermark is strengthened, the spread spectrum watermark is strengthened, and the hi-fidelity of the image is maintained.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   scanning an image pixel by pixel;
   for each pixel being scanned, evaluating the pixel with a perceptual filter, including:
      computing a differential standard deviation statistic and an entropy statistic for a group of pixels centered on the pixel; and
      mixing the differential standard deviation statistic and the entropy statistic to model a noise tolerance associated with the pixel.

2. The method as recited in claim 1, wherein the noise tolerance denotes a degree of the change in the pixel attribute that can be achieved without being perceived by the human visual system when the pixel attribute is changed for one or more of the pixels.

3. The method as recited in claim 2, wherein the pixel attribute is luminance.

4. The method as recited in claim 1, further comprising creating a noise tolerance map for the image from the noise tolerances of each pixel and using the noise tolerance map to perform denoising, medical imaging, or image compression.

5. The method as recited in claim 1, further comprising embedding data in the image by changing the pixel attribute for the pixels that possess a value of the noise tolerance above a threshold.

6. The method as recited in claim 5, wherein the data comprise a spread spectrum watermark or the data comprise bits of metadata for annotating the image.

7. The method as recited in claim 5, wherein the threshold is based on a human visual perception of an amount of the noise that can be added to an image without degrading a perceived fidelity of the image.

8. The method as recited in claim 1, further comprising embedding a spread spectrum watermark in the image to signal the presence of a metadata watermark and to provide registration or alignment of the image for blind watermark detection that does not have access to the original image;
wherein the data of the spread spectrum watermark is placed in the image based on the noise tolerance of the pixels.

9. The method as recited in claim 8, wherein the embedding further comprising creating the spread spectrum watermark in a block of the image and then tiling the same block in the image via a lapped biorthogonal transform.

10. The method as recited in claim 8, further comprising embedding the metadata watermark into the image based on the noise tolerance of the pixels by:
partitioning each block of the spread spectrum watermark into smaller blocks;
embedding each bit of the metadata by quantizing first order statistics of the coefficients of the smaller blocks, wherein the quantizing uses an even number of a quantization step size if the bit is a 0 bit and uses an odd number of the quantization step size if the bit is a 1 bit;
allocating changes to the attribute of the pixels in each smaller block such that the change is proportional to the noise tolerance of the pixel.

11. The method as recited in claim 8, wherein embedding the metadata watermark strengthens a robustness of the spread spectrum watermark to image compression and image cropping while maintaining a fidelity of the image.

12. A system, comprising:
a pixel-wise noise tolerance estimator for evaluating sites within an image for tolerance to alteration of the pixels of the image;
a perceptual filter in the pixel-wise noise tolerance estimator, including:
an entropy filter to compute an entropy statistic for a group of pixels centered on the pixel and including the pixel;
a standard deviation filter to compute a differential standard deviation statistic for the group of pixels;
a mixer for combining the entropy statistic and the differential standard deviation statistic to model a noise tolerance associated with the pixel;
wherein the noise tolerance denotes a degree of change in a pixel attribute that can be achieved without being perceived by the human visual system when the pixel attribute is changed for one or more of the pixels.

13. The system as recited in claim 12, further comprising a noise tolerance map of the image for deciding which sites in the image can tolerate alteration of an attribute of the pixels in the sites without being significantly perceived by a human visual system, wherein the alteration of the attribute of the pixels is to be performed for adding data to the image, for denoising, for medical imaging, or for image compression.

14. The system as recited in claim 13, further comprising an annotation engine, including:
a spread spectrum watermarker to embed a first watermark signaling the presence of a second watermark, wherein the first watermark comprises a spread spectrum watermark tiled over the image via a lapped biorthogonal transform; and
a metadata watermarker to embed the second watermark for storing metadata in the image, including:
a regional statistic quantifier to partition each block of the spread spectrum watermark into smaller blocks and embed each bit of the metadata by quantizing first order statistics of the coefficients of the smaller blocks, wherein the quantizing uses an even number of a quantization step size if the bit is a 0 bit and uses an odd number of the quantization step size if the bit is a 1 bit.

15. The system as recited in claim 14, further comprising an embedding site discriminator to allocate changes to the attribute of the pixels in each smaller block such that the change is proportional to the noise tolerance of the pixel.

16. The system as recited in claim 15, wherein the embedding site discriminator embeds the metadata into the image by changing the pixel attribute for the pixels that possess a value of the noise tolerance above a threshold.

17. The system as recited in claim 16, wherein the threshold is based on a human visual perception of an amount of the noise that can be added to an image without degrading a perceived fidelity of the image.

18. The system as recited in method as recited in claim 14, further comprising a multi-watermark enhancer to embed the second watermark such that the first watermark is strengthened in robustness to image compression and image cropping while maintaining hi-fidelity of the image.

19. A system, comprising:
means for visual modeling, including:
means for estimating an entropy statistic associated with each pixel of an image;
means for estimating a standard deviation statistic associated with each pixel of the image; and
means for mixing the entropy statistic and the standard deviation statistic to create an image-wide estimation map of human perceptual tolerance to alteration of the image in each part of the image.

20. The system as recited in claim 19, further comprising one of:
means for applying image compression by determining quantization noise based on the image-wide estimation map;
means for applying error correction by using less resilient coding in image areas that tolerate more noise based on the image-wide estimation map;
means for medical imaging based on the image-wide estimation map; or
means for denoising the image based on the image-wide estimation map.

* * * * *